3,214,461
PREPARATION OF 2,2,4,4 - TETRAALKYL - 3 - OXO-
BUTYRIC ACID ESTERS FROM 2,2,4,4-TETRA-
ALKYLCYCLO-BUTANE-1,3-DIONE
Edward U. Elam and Ronald G. Nations, Kingsport,
Tenn., assignors to Eastman Kodak Company, Rochester, N.Y., a corporation of New Jersey
No Drawing. Filed Feb. 26, 1962, Ser. No. 175,787
5 Claims. (Cl. 260—483)

This application is a continuation-in-part of our co-pending application of the same title, Serial No. 851,496, filed November 9, 1959.

This invention relates to esters of 2,2,4,4-tetraalkyl-3-oxobutyric acids, and to a process of making them. 2,2,4,4-Tetraalkyl-3-oxobutyric acids have the structural formula $$R^1-\overset{R^2}{\underset{R^4}{\overset{|}{C}}}H-\overset{O}{\overset{\|}{C}}-\overset{R^4}{\underset{|}{C}}-\overset{O}{\overset{\|}{C}}-OH$$

We have found that esters of these acids can be made by reacting hydroxyl compounds with 2,2,4,4-tetraalkyl-cyclobutane-1,3-diones,

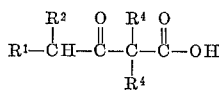

in which $R^1$, $R^2$, $R^3$ and $R^4$ are alkyl groups each containing from 1 to 4 carbon atoms, and are the same as $R^1$, $R^2$, $R^3$ and $R^4$ in the previous structural formula. The reaction may be carried out in the absence of a catalyst if the conditions are sufficiently severe, or it may be carried out in the presence of a basic catalyst.

The process of our invention is broadly useful for the esterification of a wide range of hydroxyl compounds, by which said hydroxyl compounds are converted to esters of 2,2,4,4-tetraalkyl-3-oxobutyric acids. The process of the invention is illustrated by the general equation:

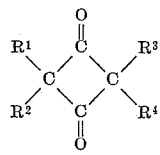

The hydroxyl compounds applicable in the practice of this invention broadly include monohydric and polyhydric organic compounds ranging in complexity from simple alcohols to complex structures containing many functional groups in addition to one or more hydroxyl groups. Thus, in the general formula, $Z(OH)_x$, X represents an organic residue ranging from a simple aliphatic, alicyclic, or aromatic radical to the complex and high-molecular weight residues found in polynuclear aromatic and alicyclic compounds, synthetic polymers, and complex products of natural origin, such as proteins, steroids, polysaccharides, and the like. Z can be exemplified by the following organic residues: $-CH_3$; $-CH_2CH_2-$; $-CH_2CHCH_2-$; $-(CH_2CH)_n-$; $CH_2=CHCH_2-$; $-CH_2C \equiv CCH_2-$; $ClCH_2CH_2-$; $-CH_2CH_2OCH_2CH_2-$; $-(CH_2)_nCO_2R$; $HSCH_2CH_2-$;

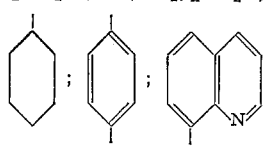

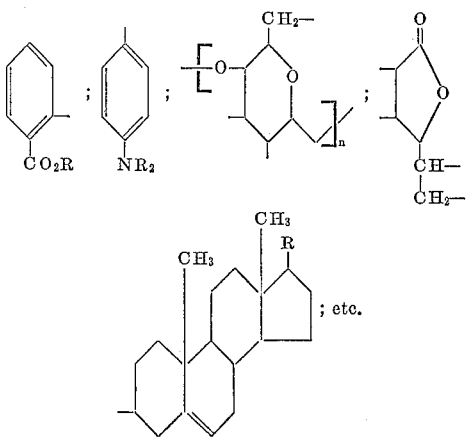

Typical examples of hydroxyl compounds applicable in the practice of this invention include monhydric alcohols such as methyl, octyl, stearyl, allyl, oleyl, propargyl, cinnamyl, geranyl, diacetone, and furfuryl alcohols, cyclohexanol, α-tetralol, norborneol, and chlolesterol; polyhydric alcohols such as ethylene, hexylene, diethylene, polypropylene, and xylene glycols, cyclohexanedimethanol, glycerol, pentaerythritol, sorbitol, quinitol, inositol, and poly(vinyl alcohol); monohydric and polyhydric phenols, such as phenol, hydroquinone, phloroglucinol, napthol, and phenanthrol; functional derivatives of monohydric and polyhydric alcohols such as chloroethanol, ethoxyethanol, butoxyethoxyethanol, benzoin, lactic acid, castor oil, tartaric acid, triethyl citrate, hydracrylonitrile, thiodiglycol, glycidol, dioxolanemethanol, hydroxymethyl-ferrocene, monoglycerides, tripentaerythritol, dimethylolurea, triethanolamine, glucose, glucuronolactone, and ascorbic acid; functional derivatives of monohydric and polyhydric phenols, such as anisole, eugenol, nitrophenol, salicylic acid, hydroxyquinoline, naptholsulfonic acid, and phenolphthalein; polysaccharides and their derivatives, such as sucrose, lactose, starch, dextrin, cellulose, cellulose acetate, and methyl cellulose. This list and the list of organic residues given above as exemplifications of the radical Z are far from complete, but they indicate the board applicability of our novel process for the esterification of hydroxyl groups in organic compounds.

The reaction can be carried out in either a homogeneous or heterogeneous system. Furthermore, functional groups other than hydroxy that are reactive toward the tetraalkylcyclobutanedione can be present in the hydroxyl compound. In the event that other reactive groups are present which react preferentially with the dione, it will be necessary to add additional dione to react with these groups above the amount calculated to react with the hydroxyl groups. Conversely, polyhydric hydroxy compounds (containing no other reactive functional groups) can be partly esterified in accordance with the invention. For example, ethylene glycol can be converted to the glycol monoester of a 2,2,4,4-tetraalkyl - 3 - oxobutyric acid, leaving the other hydroxyl group unesterified.

Thus, it can be seen that our invention provides a process broadly applicable to the production of 2,2,4,4-tetraalkyl-3-oxobutyric esters of alcohols, glycols, phenols, saccharides, and hydroxyl-containing derivatives of ethers, aldehydes, ketones, acetals, acids, esters, nitriles, mercaptans, sulfides, amines and amides, and halogen-, sulfur-, silicon-, and phosphorous-containing derivatives thereof. Such compounds may contain aliphatic, alicyclic, aromatic, and heterocyclic moieties, or combinations thereof, linked through carbon bonds or through ether, acetal, ester, sulfide, or amide bonds.

Such compounds range from simple alcohols to synthetic and natural products of high molecular weight and extreme complexity. Thus, in the general formula, $Z(OH)_x$, Z can represent an organic residue of highly varied structure, and $x$ is an integer ranging from 1 to several hundred.

The practice of our invention is illustrated but not limited by the following examples.

Example 1

A mixture of 100 g. (0.71 moles) of 2,2,4,4-tetramethylcyclobutanedione and 100 g. (3.1 moles) of methanol was heated under nitrogen in an autoclave for 12 hours at 160° C. The reaction product was filtered from the unreacted dione (identified by melting point: 114–115° C.) and distilled to give, after removal of more low boiling, solid dione, 39.5 g. (32.4% conversion) of methyl, 2,2,4-trimethyl-3-oxovalerate, boiling at 88–91° C. at 22 mm. Hg pressure. There were no high boilers.

*Analysis.*—Calcd. for $C_9H_{16}O_3$: C, 62.8; H, 9.30; saponification equivalent, 172. Found: C, 63.32; H, 9.56; sapon. equiv., 177.

Example 2

A mixture of 100 g. of 2,2,4,4-tetramethylcyclobutanedione, 95 ml. of methanol, 5 ml. of pyridine was heated in an autoclave for 6 hours at 150° C. The product was distilled to give, after removal of solvent, 5.5 g. of forerun boiling at 74–79.5° C. (13 mm.) $n_D^{20}$ 1.4271, and 103.6 g. (84.3%) of methyl 2,2,4-trimethyl-3-oxovalerate, boiling point 79.5–80° C. (13 mm.), $n_D^{20}$ 1.4244.

Example 3

A solution of about 0.1 g. of sodium in 100 ml. of absolute ethyl alcohol was placed in a 500-ml., two-neck flask which was fitted with a thermometer and a reflux condenser. The solution was cooled to 10° C. in an ice bath, and 50 g. of 2,2,4,4-tetramethylcyclobutanedione was added in small portions through the condenser. The dione dissolved almost instantly with a strongly exothermic reaction. The temperature was held below 50° C. by controlling the rate of addition of dione and by ice cooling. Immediately after addition of dione was complete, the solution was acidified with 2 ml. of acetic acid and distilled to give 57.8 g. (86.9% yield) of ethyl 2,2,4-trimethyl-3-oxovalerate boiling at 81.5–82.0° C. (9.5 mm.), $n_D^{20}$ 1.4230.

*Analysis.*—Calcd. for $C_{10}H_{18}O_{13}$: C, 64.5; H, 9.67; spon. equiv., 186. Found: C, 64.8; H, 9.78; spon. equiv., 184.

Example 4

To a slurry prepared from 140 g. (1 mole) of 2,2,4,4-tetramethyl-1,3-cyclobutanedione, 31.2 g. (0.3 mole) of 2,2-dimethyl-1,3-propanediol, and 100 ml. of benzene, there was added 5 ml. of trimethylbenzylammonium hydroxide solution ("Triton B") and the mixture was heated to reflux. As soon as the mixture had begun to boil, a moderately vigorous exothermic reaction set in. External heating was discontinued, and the solution was allowed to stand at room temperature for about two hours, then filtered from excess dione (51 g.). The filtrate was heated on the steam bath to remove benzene, and the residue distilled to give, after removal of low boilers, fractions boiling, at 2 mm., at 125–130° C., $n_D^{20}$ 1.4478, 38.2 g. (2,2 - dimethyl - 1,3 - propanediol)mono - 2,2,4 - trimethyl-3-oxovalerate, (52.1% yield); at 130–170° C., 5.0 g.; and at 170–178° C., $n_D^{20}$ 1.4481, 13.1 g. [2,2-dimethyl - 1,3 - propanediol]bis(2,2,4 - trimethyl - 3 - oxovalerate), 11.8% yield.

*Analysis.*—Calculated: For $C_{13}H_{24}O_4$ (monoester), sapon. equiv. 244; for $C_{21}H_{36}O_6$ (diester), sapon. equiv. 192. Found: For 125–130° C. (2 mm.) fraction, sapon. equiv. 248; for 170–178° C. (2 mm.) fraction, sapon. equiv. 184.

Example 5

A mixture of 70 g. (0.5 mole) of 2,2,4,4-tetramethylcyclobutanedione, 15 g. (0.24 mole) of ethylene glycol, and 15 ml. of pyridine was heated to 200° C. for 12 hours in an autoclave. The product, which was homogeneous, was distilled to give 63.0 g. (76.6% yield) of ethylene glycol bis(2,2,4-trimethyl-3-oxovalerate), B.P. 185–187° C. (5.5 mm.), $n_D^{20}$ 1.4484.

*Analysis.*—Calcd. for $C_{18}H_{30}O_6$: C, 63.1; H, 8.76; sapon. equiv., 171. Found: [185–187° C. (5.5 mm.) fraction]: C, 63.40; H, 8.79; sapon. equiv., 168.

EXAMPLE 6

A mixture of 110 g. of 2,2,4,4-tetramethyl-1,3-cyclobutanedione, 50 g. of 2,2,4,4-tetramethyl-1,3-cyclobutanediol, and 0.5 g. of sodium was heated to about 100° C. and 2 ml. of anhydrous ethyl alcohol was added to the resulting slurry. The temperature rose to about 140–145° C. and was maintained in this range for 45 minutes. The product, which solidified on cooling, was recrystallized from acetone to give 87 g. (58% yield) of pure 2,2,4,4 - tetramethyl - 1,3-cyclobutanediol bis(2,2,4-trimethyl-3-oxovalerate), M.P. 113–114° C. This product gave a sharp depression of a mixed melting point with 2,2,4,4-tetramethyl-1,3-cyclobutanediol and with 2,2,4,4-tetramethyl-1,3-cyclobutanedione, as well as with 2,2,4,4-tetramethyl-3-hydroxycyclobutanone.

EXAMPLE 7

Butyl 2,2,4-trimethyl-3-oxovalerate was prepared from butyl alcohol and tetramethylcyclobutanedione using pyridine catalyst as described in Example 2. A 17.5% yield of ester boiling from 113–114° C. (14 mm.), $n_D^{20}$ 1.4288, was obtained.

*Analysis.*—Calcd. for $C_{12}H_{22}O_3$: C, 67.3; H, 10.29; sapon. equiv., 214. Found: C, 67.48, 66.97; H, 10.36, 10.37; sapon. equiv., 217.9, 219.4.

EXAMPLE 8

A mixture of 80 g. of tetramethyl-1,3-cyclobutanedione, 53 g. of phenol and 0.1 g. of sodium metal was heated to about 90° C. Two ml. of ethanol was then added to the hot solution and the reaction mixture was heated to 190–195° C. for 10 minutes. Distillation of the reaction mixture gave 114 g. (86% yield) of phenyl 2,2,4-trimethyl-3-oxovalerate, B.P. 95–96° C. (0.5 mm.), $n_D^{20}$ 1.4859.

*Analysis.*—Calcd. for $C_{14}H_{18}O_3$: saponification equivalent 234. Found: sapon. equiv., 229.

EXAMPLE 9

A mixture of 80 g. of tetramethyl-1,3-cyclobutanedione, 31 g. of hydroquinone, and 0.1 g. of sodium metal was heated to about 90° C. Two ml. of ethanol was added to the reaction mixture, and the reaction temperature rose spontaneously to about 150° C. The reaction mixture was heated to 230° C. for 15 minutes. It solidified on cooling; recrystallization gave hydroquinone bis (2,2,4-trimethyl-3-oxovalerate), M.P. 106–7° C.

*Analysis.*—Calcd. for $C_{22}H_{30}O_6$: C, 67.7; H, 7.69. Found: C, 67.47; H, 7.80.

EXAMPLE 10

A mixture of 50 g. of sucrose and 170 g. of tetramethyl-1,3-cyclobutanedione was heated with 0.2 g. of sodium metal to 130° C. Three ml. of absolute alcohol and 20 ml. of xylene were added. The mixture was heated for 2 hrs. at the reflux point of xylene and then filtered. The filtrate was heated at about 200° C. for about 1 hour, during which time unreacted tetramethyl-1,3-cyclobutanedione sublimed. The reaction mixture was dissolved in twice its volume of benzene, extracted with 250 ml. of 10% sodium hydroxide solution, and washed with water. The benzene solution was heated and treated with successive quantities of decolorizing charcoal until a clear, nearly colorless filtrate was obtained. Removal of the solvent left 105 g., a 48% yield, of sucrose octa-(2,2,4-trimethyl-3-oxovalerate), a viscous syrup.

EXAMPLE 11

One gram of sodium metal was dissolved in 100 ml. of methanol, and the solution was placed in a 500 ml., 3-necked flask which was fitted with a drying tube, stirrer, and thermometer. The solution was cooled to −15° C. and tetramethylcyclobutanedione was added cautiously. An exothermic reaction began at once; the temperature rose to −10° C. after only a small amount of tetramethylcyclobutanedione had been added. The temperature of the reaction mixture was then lowered by strong cooling to about −25° C., and a total of 40 g. of tetramethylcyclobutanedione was added. After the addition had been completed, but while solid dione still remained in the reaction mixture, the temperature was lowered by cooling in Dry Ice to −45° C. and the mixture was stirred at that temperature for 1 hr., then acidified, while the temperature was still −45° C., with 5 ml. of acetic acid. After the acidification, the mixture was allowed to warm to room temperature and analyzed by gas chromatography. The peaks corresponding to tetramethylcyclobutanedione and to methyl 2,2,4-trimethyl-3-oxovalerate were measured, the area of the tetramethylcyclobutanedione peak was approximately 4% of the total area of the two peaks. Distillation of the reaction mixture gave 26.5 g. (54% yield) of methyl 2,2,4-trimethyl-3-oxovalerate, boiling at 91–95° C. at 25 mm.

EXAMPLE 12

A solution of 50 g. of 2,4-dibutyl-2,4-diethyl-1,3-cyclobutanedione and 50 ml. of ethanol was heated to about 60° C. 0.2 g. of sodium methoxide was added to the solution. The reaction mixture turned red brown in color; it was heated at reflux for 6 hours. The excess ethanol was evaporated and the residue was filtered while still warm. Distillation gave 20 g. (33% yield) of ethyl 2-butyl-2,4-diethyl-3-oxooctanoate, B.P. 108.2° C./3.7 mm. Hg, $n_D^{20}$ 1.4537.

EXAMPLE 13

A mixture of 286 g. of tetramethyl-1,3-cyclobutanedione, 100 g. of α-methyl-d-glucoside and 0.3 g. metallic sodium was heated to reflux for 4 hours. The reaction mixture was cooled and dissolved in 500 ml. of ether and extracted with five 200 ml. portions of 10% sodium hydroxide solution and then with three 300 ml. portions of water. The ether solution was treated with four 5 gram portions of Norit vegetable char (a decolorizing carbon); Filtercel (diatomaceous earth) was added as a filter aid. The solution was treated with 10 g. of alumina and filtered through an analytical grade Celite (diatomaceous earth) pad. The ether was evaporated, leaving 280 g. of the 2,2,4-trimethyl-3-oxovaleric acid ester of α-methyl-d-glucoside. This ester was found to be compatible with, and to give a good film with, cellulose acetate-butyrate of ½-sec. viscosity, in equal proportions.

EXAMPLE 14

A mixture of 32 g. of tetramethyl-1,3-cyclobutanedione and 40 g. of isobutyl hydroxypivalate was heated to 90° C. 0.2 g. of sodium methoxide and 10 ml. of toluene were added. The reaction mixture was heated at reflux for three hours. Distillation gave 45 g. (62.5% yield) of the isobutyl ester of (2,2,4-trimethyl-3-oxovaleryloxy)-pivalic acid,

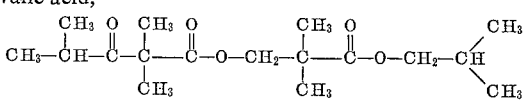

B.P. 122° C./2 mm.), $n_D^{20}$ 1.4368.

EXAMPLE 15

A solution of 0.5 g. of sodium methoxide in 71 g. (1 mole) of hydracrylonitrile was treated with 70 g. (0.5 mole) of tetramethyl-1,3-cyclobutanedione. The mixture was stirred at room temperature until the dione had all dissolved, then acidified with 5 ml. of acetic acid and distilled. After removal of excess hydracrylonitrile, 69 g. (65% yield) of (2-cyanoethyl)-2,2,4-trimethyl-3-oxovalerate was obtained.

EXAMPLE 16

Procedures of the preceding examples were employed to prepare the esters of 2,2,4-trimethyl-3-oxovaleric acid shown in Table I. The appropriate hydroxyl compound and tetramethyl-1,3-cyclobutanedione were reacted in the presence of a basic catalyst such as sodium metal or sodium methoxide in the manner described in detail in the previous examples. In Table I the symbol, R, designates the 2,2,4-trimethyl-3-oxovaleryl radical, $(CH_3)_2CHCOC(CH_3)_2CO-$

Table I

| Hydroxyl Compound | Ester | B.P., ° C. (mm.) | $n_D^{20}$ |
|---|---|---|---|
| 1. Isopropyl alcohol | $(CH_3)_2CHOR$ | 113–6 (37) | 1.4209 |
| 2. Isobutyl alcohol | $(CH_3)_2CHCH_2OR$ | 113–5 (14–16) | 1.4262 |
| 3. t-Butyl alcohol | $(CH_3)_3COR$ | 100–104 (6) | 1.4212 |
| 4. 2-ethylhexanol | $C_4H_9CH(C_2H_5)CH_2OR$ | 120 (2) | 1.4327 |
| 5. 2,2,4-trimethylpentanol | $(CH_3)_2CHCH_2C(CH_3)_2OR$ | 146 (13) | 1.4370 |
| 6. Decyl alcohol | $C_{10}H_{21}OR$ | 156–167 (6) | 1.4400–1.4416 |
| 7. Allyl alcohol | $CH_2=CHCH_2OR$ | 95–6 (10) | 1.4369 |
| 8. Ethylene glycol | $ROCH_2CH_2OR$ | 123–4 (3) | 1.4459 |
| 9. Ethylene glycol monoisobutyrate | $(CH_3)_2CHCO_2CH_2CH_2OR$ | 196 (55) | 1.4366 |
| 10. 2,2-dimethyl-1,3-propanediol | $ROCH_2C(CH_3)_2CH_2OH$ | 126 (4) | 1.4470 |
| 11. 2,2-dimethyl-1,3-propanediol monoisobutyrate | $(CH_3)_2CHCO_2CH_2C(CH_3)_2CH_2OR$ | 135 (2.5) | 1.4381 |
| 12. Diethylene glycol | $O(CH_2CH_2OR)_2$ | 200–5 (3) | 1.4492 (21°) |
| 13. Triethylene glycol | $-(CH_2OCH_2CH_2OR)_2$ | 201–3 (1) |  |
| 14. Trimethylol propane | $CH_3CH_2C(CH_2OR)_3$ |  | 1.4585 |
| 15. Glycerol | $ROCH(CH_2OR)_2$ |  |  |
| 16. Pentaerythritol | $C(CH_2OR)_4$ | M.P. 91–2 |  |
| 17. Mannitol | $ROCH_2(CHOR)_4CH_2OR$ |  |  |
| 18. Poly(vinyl alcohol) | $-(CH_2CHOR)_n-$ | Gum |  |
| 19. Isobutyl hydroxypivalate | $(CH_3)_2CHCH_2O_2CC(CH_3)_2CH_2OR$ | 112 (2) | 1.4368 |
| 20. Thiodiethanol | $S(CH_2CH_2OR)_2$ | 110 (0.004) | 1.4720 |
| 21. Triethanolamine | $N(CH_2CH_2OR)_3$ |  |  |
| 22. α-Methylglucoside |  | Gum |  |
| 23. Sucrose tri(2-ethylhexanoate) | $C_{12}H_{14}O_3(OH)_2(OCOC_7H_{15})_3(OR)_3$ | Gum |  |
| 24. Cellulose (wood pulp) | $[C_6H_7O_2(OR)_3]_n$ | Gum |  |

EXAMPLE 17

Procedures of the preceding examples were employed to prepare the esters of 2,2,4-triethyl-3-oxohexanoic acid shown in Table II. The appropriate hydroxyl compound and tetraethyl-1,3-cyclobutanedione were allowed to react in the presence of a basic catalyst. In Table II the symbol, R, designates the 2,2,4-triethyl-3-oxohexanoyl radical, $(C_2H_5)_2CHCOC(C_2H_5)_2CO-$.

Table II

| Hydroxyl Compound | Ester | B.P., °C. (mm.) | $n_D^{20}$ |
|---|---|---|---|
| Methanol | $CH_3OR$ | 121-2 (10) | 1.4456 |
| Ethanol | $C_2H_5OR$ | 124 (8) | 1.4436 |
| Isobutyl alcohol | $(CH_3)_2CHCH_2R$ | 99 (1.4) | 1.4450 |
| n-Butyl alcohol | $C_4H_9OR$ | 100 (0.6) | 1.4462 |
| Allyl alcohol | $CH_2=CHCH_2OR$ | 89-91 (1) | 1.4562 |
| Propargyl alcohol | $CH\equiv CCH_2OR$ | 126 (6) | 1.4640 |
| Phenol | $C_6H_5OR$ | 129-132 (1) | 1.4992 |
| Hydroquinone | $C_6H_4(OR)_2$ | M.P. 92-6 | |

EXAMPLE 18

Procedures of the preceding examples were employed to prepare the esters of 2,4-dimethyl-2-propyl-3-oxoheptanoic acid shown in Table III. The appropriate hydroxyl compound and 2,4-dimethyl-2,4-dipropyl-1,3-cyclobutanedione were reacted in the presence of a basic catalyst. In Table III the symbol, R, designates the 2,4-dimethyl-2-propyl-3-oxoheptanoyl radical,

$(CH_3)(C_3H_7)CHCOC(CH_3)(C_3H_7)CO-$

Table III

| Hydroxyl Compound | Ester | B.P., °C. (mm.) | $n_D^{20}$ |
|---|---|---|---|
| Ethanol | $C_2H_5OR$ | 88-92 (1) | 1.4413 |
| Phenol | $C_6H_5OR$ | 125-8 (0.8) | 1.4983 |
| Allyl alcohol | $CH_2=CHCH_2OR$ | 95-7 (3) | 1.4577 |

EXAMPLE 19

Procedures of the preceding examples were employed to prepare the esters of 2-butyl-2,4-diethyl-3-oxooctanoic acid shown in Table IV. The appropriate hydoxyl compound and 2,4-dibuty-2,4-diethyl - 1,3 - cyclobutanedione were reacted in the presence of a basic catalyst. In Table IV, the symbol, R, designates the 2-butyl-2,4-diethyl-3-oxooctanoyl radical,

$(C_4H_9)(C_2H_5)CHCOC(C_2H_5)(C_4H_9)CO-$

Table IV

| Hydroxyl Compound | Ester | B.P., °C. (mm.) | $n_D^{20}$ |
|---|---|---|---|
| Phenol | $C_6H_5OR$ | 135-8 (0.5) | 1.5147 |
| Allyl alcohol | $CH_2:CHCH_2OR$ | 126-8 (4) | 1.4638 |

In carrying out our invention, when the catalyst used is a basic substance which has an ionization constant greater than $1\times10^{-2}$, such as a sodium alkoxide or trimethylbenzylammonium hydroxide, the amount of catalyst should not exceed 5% of the weight of the tetraalkylcyclobutane-1,3-dione, and should preferably be from 0.05% to 5% of its weight. When the catalyst is a basic substance which has an ionization constant less than $1\times10^{-2}$, e.g. the weak organic bases, of which pyridine is an example, no upper limit need be placed on the amount of catalyst, except for reasons of economy. The preferred range is from 5% to 50% of the weight of the tetraalkylcyclobutane-1,3-dione. The temperature at which the reaction is carried out may be from $-45°$ C. to $250°$ C., depending upon the reactants and the catalyst. The temperature and the reaction time should be kept as low as practicable, in order to avoid cleavage of the tetraalkylcyclobutanedione to diisoalkylketone, and side reactions.

Any basic material which does not itself react excessively with the tetraalkylcyclobutanedione will catalyze the reaction. Bases which may be used include quaternary ammonium hydroxides, alkali and alkaline earth metal alkoxides, oxides, hydroxides and carbonates; tertiary amines such as pyridine and triethylamine, and secondary amines such as piperidine.

The basic catalyst can be formed in situ in the reaction mixture by adding an alkali metal such as granules of metallic sodium, as illustrated in certain of the examples above. Thus, while metallic sodium is not a base itself, under the concept of G. N. Lewis, its effect is to create a basic catalyst when added to the reaction mixture. Therefore, when we refer in the specification and claims to the use of a basic catalyst we mean to include substances, such as the alkali metals, that form a basic catalyst in the reaction mixture. Metallic sodium and the sodium alkoxides such as sodium methoxide, sodium ethoxide and the like are particularly effective and are prefered catalysts for the process of the invention, especially in reactions of complex polyols such as cellulose.

Water reacts with the tetraalkylcyclobutanedione, causing cleavage to diisoalkylketone and undesired side reactions, and thus undersirably consuming the dione intended for reaction with the hydroxyl compound. Accordingly, the process of the invention is carried out under anhydrous conditions or at least in the presence of no more than small amounts of water.

The process of our invention is useful for preparing novel esters, for example, useful as plasticizers for cellulose esters and other polymeric plastic substances. It is also useful as a method for treating complex substances having reactive hydroxyl groups to esterify the hydroxyl groups and thereby obtain products having modified properties. As an example, the new process can be used for esterifying and thereby stabilizing proteins. It can be used to treat cellulose, for example, wood pulp, to obtain an esterified gum which is useful as a sealing material for coating porous surfaces. In this use the cellulose ester gum produced by our method forms a hard but flexible coating that flows to fill pores and cracks. In general, the method of the invention can be used to form esterified derivatives of hydroxyl compounds for uses in which lower alkanoic acid esters of such compounds have heretofore been found useful. A valuable characteristic of the process of the invention is that it produces esterified products having excellent hydrolytic stability and quite good thermal stability.

Esters of the 2,2,4,4-tetraalkyl-3-oxobutyric acids, prepared by the process of our invention, are useful as cellulose ester plasticizers. For example, a mixture of cellulose acetate butyrate and 15 parts of tetramethylcyclobutanediol bis(2,2,4-trimethyl-3-oxovalerate) was molded into a smooth, hard plate which was found to have the following mechanical properties:

Rockwell hardness _____ 38.0
Button impact _____ 25.2
Yield strength (lb./in.$^2$) _____ 5510
Breaking strength (lb./in.$^2$) _____ 5020
Tensile elongation (percent) _____ 30
Apparent Young's Modulus (lb./in.$^2$) _____ $1.74\times10^5$
Water absorption (ASTM), percent _____ 1.50

The tetraalkyl-1,3-cyclobutanediones used as starting materials in the process of this invention may conveniently be prepared from the corresponding dialkylacetyl chlorides by the procedure of Miller and Johnson, J. Org. Chem. 1, 135 (1936). Tetramethyl-1,3-cyclobutanedione, M. P. 114-115° C., 2,4-dibutyl-2,4-diethyl-1,3-cyclobutanedione, B.P. 101° C. (.15 mm.), $n_D^{20}$ 1.4547, and 2,4-diethyl-2,4-dimethyl-1,3-cyclobutanedione, B.P. 80-90° C. (15 mm.), $n_D^{20}$ 1.4360, may be prepared in this way from the acid chlorides of isobutyric, 2-ethylhexanoic, and 2-methylbutyric acids, respectively. The last-named dione may also be prepared by heating ethyl methyl ketene as described by Staudinger et al., Helv. Chim. Acta 6, 291 (1923).

The invention has been described in considerable detail with particular reference to certain preferred embodiments thereof, but it will be understood that variations and modifications can be effected within the spirit and scope of the invention as described hereinabove, and as defined in the appended claims.

This application is a continuation-in-part of our co-pending application of the same title, Serial No. 851,496, filed November 9, 1959.

We claim:

1. 2,2,4,4-tetramethyl-1,3-cyclobutanediol bis(2,2,4-trimethyl-3-oxovalerate).

2. The process which comprises reacting a 2,2,4,4-tetraalkylcyclobutane-1,3-dione in which each alkyl group contains from 1 to 4 carbon atoms with a hydroxyl compound under substantially anhydrous conditions in the presence of a basic catalyst which does not react excessively with said 2,2,4,4-tetraalkylcyclobutane-1,3-dione at a temperature of $-45°$ C. to $250°$ C. and obtaining an ester of 2,2,4,4-tetraalkyl-3-oxobutyric acid in which each alkyl group contains 1 to 4 carbon atoms.

3. The process which comprises reacting a 2,2,4,4-tetraalkylcyclobutane-1,3-dione in which each alkyl group contains 1 to 4 carbon atoms with a hydroxyl compound under substantially anhydrous conditions at a temperature of from $-45°$ to $250°$ C. in the presence of from 0.05% to 5%, based on the weight of the 2,2,4,4-tetraalkylcyclobutane-1,3-dione, of a basic substance which does not react excessively with said 2,2,4,4-tetraalkylcyclobutane-1,3-dione and which has an ionization constant greater than $1 \times 10^{-2}$ and obtaining an ester of 2,2,4,4-tetraalkyl-3-oxobutyric acid in which each alkyl group contains from 1 to 4 carbon atoms.

4. The process of claim 3 in which the basic substance is selected from the group consisting of metallic sodium and a sodium alkoxide.

5. The process which comprises reacting a 2,2,4,4-tetraalkylcyclobutane-1,3-dione in which each alkyl group contains 1 to 4 carbon atoms, with a hydroxyl compound under substantially anhydrous conditions at a temperature of from $-45°$ C. to $250°$ C. in the presence of from 5% to 50%, based on the weight of the 2,2,4,4-tetraalkylcyclobutane-1,3-dione, of a basic substance which does not react excessively with said 2,2,4,4-tetraalkylcyclobutane-1,3-dione and which has an ionization constant less than $1 \times 10^{-2}$ and obtaining an ester of 2,2,4,4-tetraalkyl-3-oxobutyric acid in which each alkyl group contains 1 to 4 carbon atoms.

References Cited by the Examiner
UNITED STATES PATENTS

| | | | |
|---|---|---|---|
| 2,180,953 | 11/39 | Gleason | 260—479 |
| 2,228,452 | 1/41 | Gleason | 260—483 |
| 2,628,249 | 2/53 | Bruno | 260—479 X |
| 2,852,470 | 9/58 | Henne et al. | 260—485 |
| 2,960,548 | 11/60 | Ayers et al. | 260—483 X |
| 3,057,914 | 10/62 | Kitchens et al. | 260—479 |
| 3,157,692 | 11/64 | Clark et al. | 260—483 |

OTHER REFERENCES

Freylon: Ann. Chem. Phys. 20, 83 (1910).
Reid et al.: J. Am. Chem. Soc., 75, 1665, 60 (1953).
Wagner & Zook: Synthetic Organic Chemistry, John Wiley & Sons, Inc. New York, 1953, p. 482.

LORRAINE A. WEINBERGER, *Primary Examiner.*

A. LOUIS MONOCELL, LEON ZITVER, *Examiners.*